(12) United States Patent
Chiang

(10) Patent No.: US 10,220,753 B2
(45) Date of Patent: Mar. 5, 2019

(54) VEHICLE HEADREST STRUCTURE

(71) Applicant: Hsueh-Chi Chiang, Taipei (TW)

(72) Inventor: Hsueh-Chi Chiang, Taipei (TW)

( * ) Notice: Subject to any disclaimer, the term of this patent is extended or adjusted under 35 U.S.C. 154(b) by 0 days.

(21) Appl. No.: 15/628,649

(22) Filed: Jun. 21, 2017

(65) Prior Publication Data

US 2018/0370398 A1 Dec. 27, 2018

(51) Int. Cl.
*A47C 1/10* (2006.01)
*B60N 2/885* (2018.01)
*B60N 2/853* (2018.01)
*A47C 7/38* (2006.01)
*B60N 2/838* (2018.01)

(52) U.S. Cl.
CPC ............ *B60N 2/885* (2018.02); *B60N 2/853* (2018.02); *A47C 7/38* (2013.01); *B60N 2/838* (2018.02); *B60N 2205/30* (2013.01)

(58) Field of Classification Search
CPC ........ B60N 2/874; B60N 2/838; B60N 2/868; B60N 2/856; B60N 2/882; B60N 2/885; B60N 2/80; B60N 2/2851; B60N 2/847; B60N 2/2872; B64D 11/0642
USPC ....... 297/406, 391, 394, 400, 401, 402, 403, 297/408, 409
See application file for complete search history.

(56) References Cited

U.S. PATENT DOCUMENTS

| | | | | |
|---|---|---|---|---|
| 5,806,933 A | * | 9/1998 | Tsui | A47C 7/38 297/391 |
| 6,761,403 B2 | * | 7/2004 | Pal | B60N 2/427 297/216.12 |
| 9,463,725 B2 | * | 10/2016 | Szczygiel | B60N 2/885 |
| 2012/0080921 A1 | * | 4/2012 | Vicente | A61G 15/08 297/391 |
| 2015/0284094 A1 | * | 10/2015 | Bendele | B64D 11/064 297/337 |
| 2016/0226689 A1 | * | 8/2016 | Kim | H04L 27/2602 |

* cited by examiner

*Primary Examiner* — Chi Q Nguyen
(74) *Attorney, Agent, or Firm* — Raymond Y. Chan; David and Raymond Patent Firm

(57) ABSTRACT

A vehicle headrest structure includes a fixing seat, having a plurality of buckle grooves and a buckle slot; two cover plates, detachably connected to the fixing seat; two axle portions, disposed at outer end portions of the fixing seat respectively and each provided with a protruding axle and at least one accommodation recess, a spring and a steel ball being provided in the accommodation recess; two headrest bodies, each including a turning arm, a headrest portion at one end of the turning arm, and a pivot portion at another end of the turning arm, an inner side of the pivot portion being provided with a plurality of positioning recesses arranged in a circle, an outer side of the pivot portion being provided with a stepped perforation; and a screw, inserted in the stepped perforation and screwed to the protruding axle of each of the axle portions.

2 Claims, 12 Drawing Sheets

VEHICLE HEADREST STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a vehicle headrest structure, and more particularly to a vehicle headrest structure having a buckle slot. There is no need to adjust the length of a fixing seat. The vehicle headrest structure may be applied to headrest support rods having a different interval.

Description of Related Arts

Driving a long distance is easy to fatigue. In order to ensure traffic safety, the driver needs to take a rest. An adjustable headrest is mounted to the support rods of a vehicle seat for the user's head to rest thereon. A conventional vehicle headrest, as shown in FIG. 1 to FIG. 6, comprises a fixing seat 10 and an adjustment seat 11. The fixing seat 10 is provided with an adjustment portion 12. One end of the adjustment seat 11 is slidably fitted on the adjustment portion 12. One side of the fixing seat 10 is provided with a plurality of first buckle grooves 13. One side of the adjustment seat 11 is provided with a plurality of second buckle grooves 14. Two cover plates 15 are respectively connected to the sides of the fixing seat 10 and the adjustment seat 11 with screws to cover the first and second buckle grooves 13, 14 at the sides of the fixing seat 10 and the adjustment seat 11. Two axle seats 16 are provided at outer end portions of the fixing seat 10 and the adjustment seat 11, respectively. Opposite outer sides of the two axle seats 16 are each provided with a protruding member 17. The protruding member 17 has an engaging groove 171 for receiving a positioning elastic plate 18. One end of the positioning elastic plate 18 is a fixed end 181, and the other end is an engaging end 182 (as shown in FIG. 2). A shaft 19 is provided on the protruding member 17 of the axle seat 16. Two headrest bodies 22 are provided at the outer sides of the axle seats 16, respectively. Each headrest body 20 includes a turning arm 21, a headrest portion 22 at one end of the turning arm 21, and a pivot portion 23 at another end of the turning arm 21. An inner side of the pivot portion 23 is provided with an accommodation room 24. The wall of the accommodation room 24 has a plurality of positioning grooves 25 formed thereon. An outer side of the pivot portion 23 is provided with a stepped perforation 26 penetrating through the pivot portion 23. A screw 27 is inserted in the stepped perforation 26 and screwed to the shaft 19 of the axle seat 16. A plug 28 is provided on the stepped hole 26. After assembly, an adjustable vehicle headrest is completed. However, the forgoing structure has some shortcomings.

1. When the buckle grooves 13, 14 are mated with the support rods 1, it is necessary to adjust the relative position of the fixing seat 10 and the adjustment seat 11 before assembled because the interval between the two support rods 1 is different depending on the types of cars. This way is troublesome and inconvenient. Through the buckle grooves 13, 14, the fixing seat 10 and the adjustment seat 11 are collocated with each other and retractable to adjust the length. Such a structure is complicated, and the manufacturing cost is relatively increased.

2. Through the engaging end 182 of the positioning elastic plate 18 to engage with one of the positioning grooves 25, the headrest body 20 can be turned and adjusted for a desired angle. The positioning elastic plate 18 is formed by bending a metal thin plate. When applied with a force, the positioning elastic plate 18 may have a portion subjected to a greater deformation due to the angular design of the positioning elastic plate 18. For example, the edge of the engaging groove 171 becomes the fulcrum of the positioning elastic plate 18. It will cause a permanent deformation after repeated use, resulting in that the positioning elastic sheet doesn't have sufficient elasticity to position the headrest body 20.

Accordingly, the inventor of the present invention has devoted himself based on his many years of practical experiences to solve these problems.

SUMMARY OF THE PRESENT INVENTION

The primary object of the present invention is to solve the above-mentioned problems and to provide a vehicle headrest structure. The main technical feature is described below. One side of a fixing seat is provided with a plurality of buckle grooves and a buckle slot. A headrest support rod is received in one of the buckle grooves, and another headrest support rod of a different interval is received in the buckle slot. In addition, a pivot portion of a headrest body is provided with a plurality of positioning recesses arranged in a circle. The fixing seat is provided with an accommodation recess for accommodating a spring and a steel ball therein. The steel ball is elastically pressed against one of the positioning recesses, so that the headrest body can be positioned at a desired angle to achieve a more durable effect.

In order to achieve the aforesaid object, a vehicle headrest structure is provided. The headrest structure comprises a fixing seat, two cover plates, two axle portions, two headrest bodies, and a screw. The fixing seat has a plurality of buckle grooves and a buckle slot at a side thereof. The two cover plates are detachably connected to the side of the fixing seat for covering the buckle grooves and the buckle slot at the side of the fixing seat. The two axle portions are disposed at outer end portions of the fixing seat, respectively. Opposite outer sides of the two axle portions each have a connecting surface. The connecting surface is provided with a protruding axle and at least one accommodation recess. A spring and a steel ball are provided in the accommodation recess. A portion of the steel ball elastically extends out of the connecting surface. The two headrest bodies each include a turning arm, a headrest portion at one end of the turning arm, and a pivot portion at another end of the turning arm. An inner side of the pivot portion is provided with a plurality of positioning recesses arranged in a circle. An outer side of the pivot portion is provided with a stepped perforation penetrating through the pivot portion. The pivot portions of the two headrest bodies are pivotally connected to the protruding axles of the two axle portions, respectively. The steel ball in the accommodation recess is engaged in one of the positioning recesses. The screw is inserted in the stepped perforation and screwed to the protruding axle of each of the axle portions.

In an embodiment, an inner side of the headrest portion is provided with a curved surface.

According to the above-mentioned structure, the fixing seat can be applied to the headrest support rods of different models without adjusting the length. The vehicle headrest structure of the present invention can be assembled conveniently and used with ease, and has a low manufacturing cost, and is more durable and comfortable.

DETAILED DESCRIPTION OF THE PREFERRED EMBODIMENT

Figure 1:
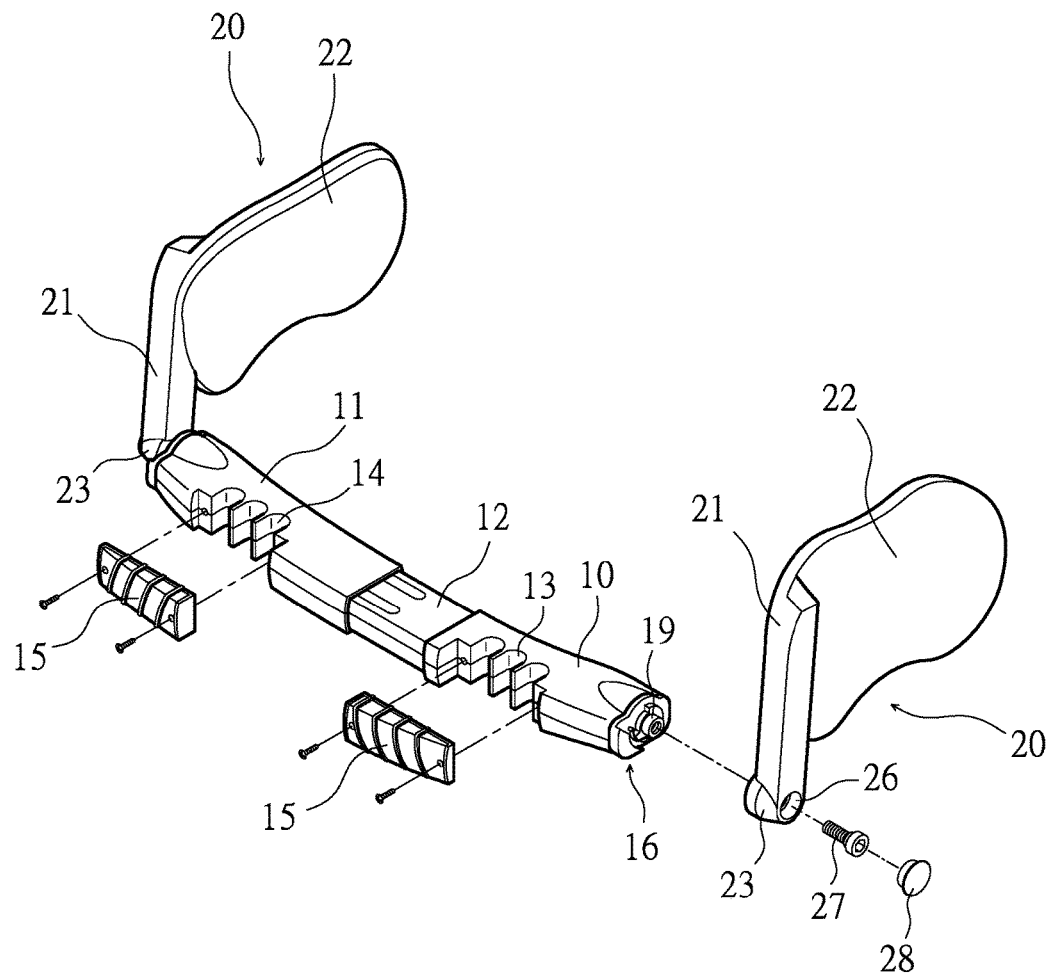
FIG. 1 is an exploded view of a conventional vehicle headrest.
Figure 2:
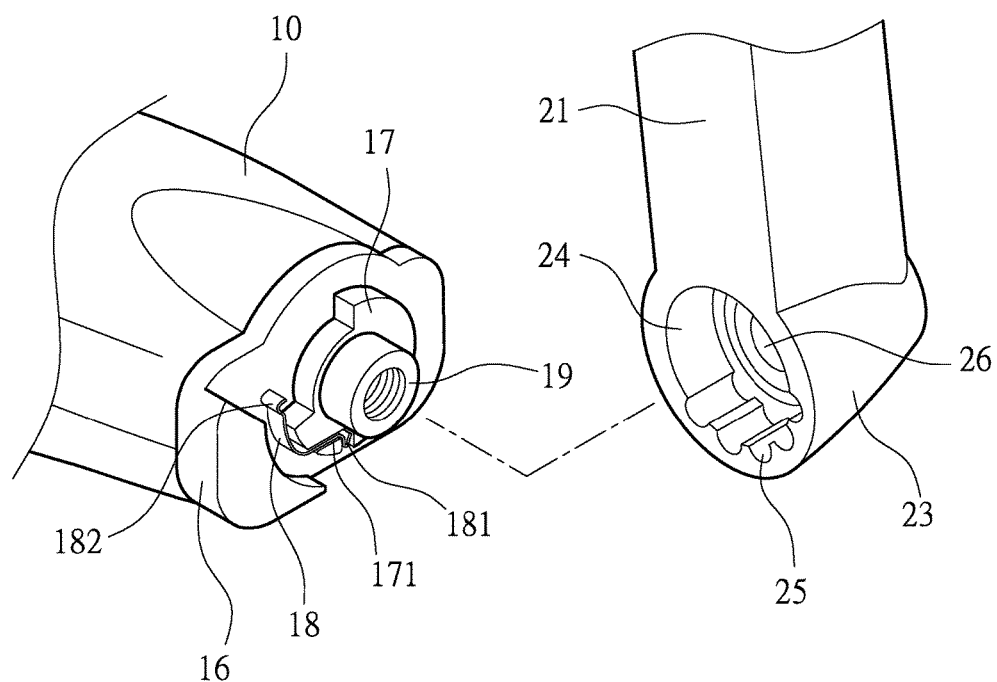
FIG. 2 is a partial exploded view of the conventional vehicle headrest, showing the axle seat and the pivot portion.
Figure 3:
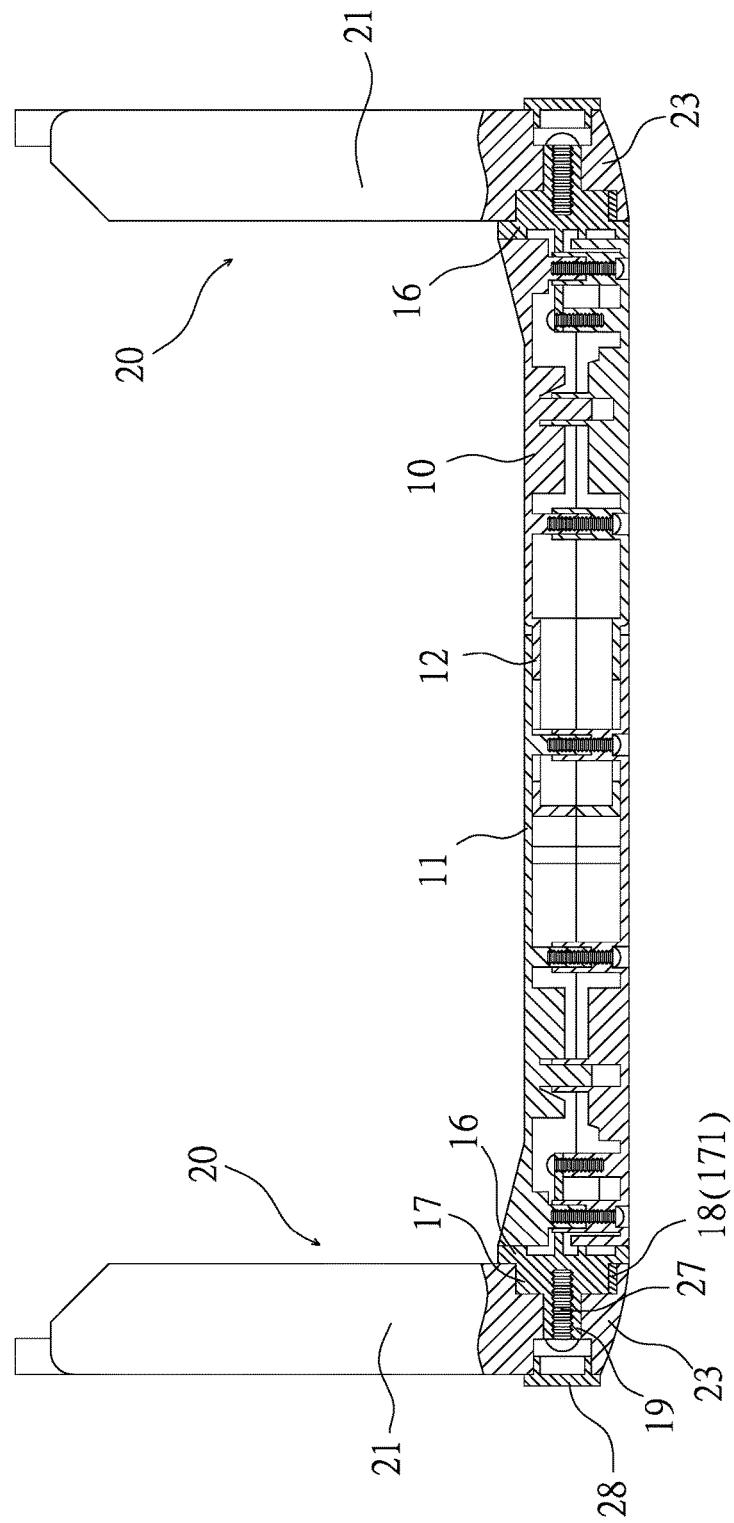
FIG. 3 is a front sectional view of the conventional vehicle headrest.
Figure 4:
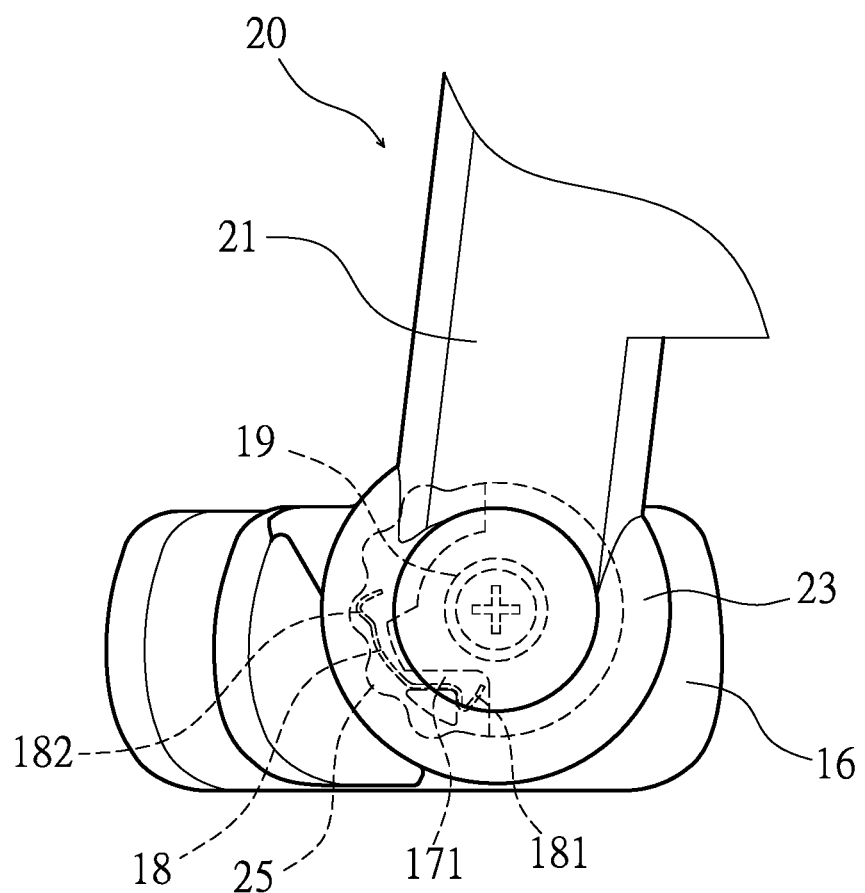
FIG. 4 is an enlarged schematic view of the conventional vehicle headrest, showing the assembly of the pivot portion of the headrest body and the axle seat.
Figure 5:
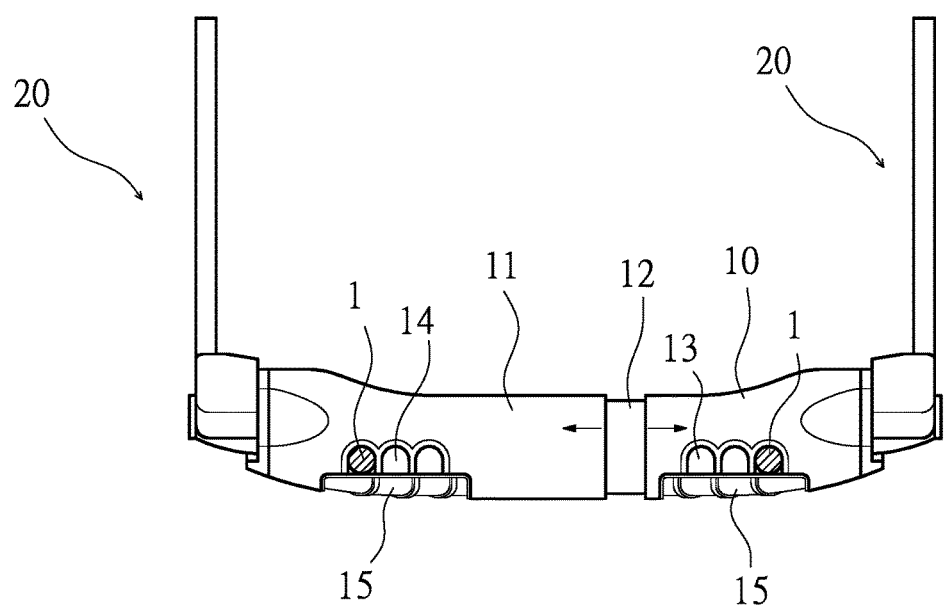
FIG. 5 is a schematic view of the conventional vehicle headrest mounted to a pair of support rods having a larger interval therebetween.
Figure 6:
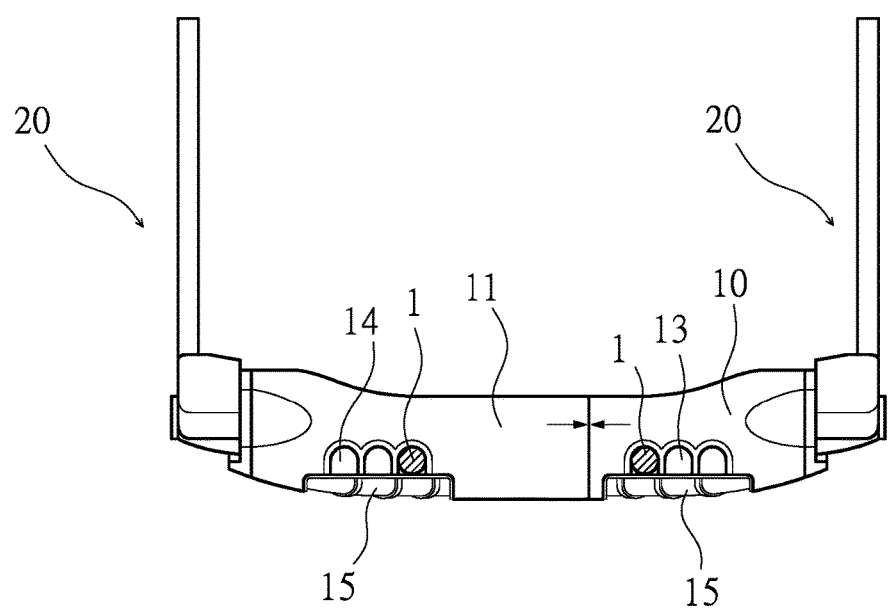
FIG. 6 is a schematic view of the conventional vehicle headrest mounted to a pair of support rods having a smaller interval therebetween.
Figure 7:
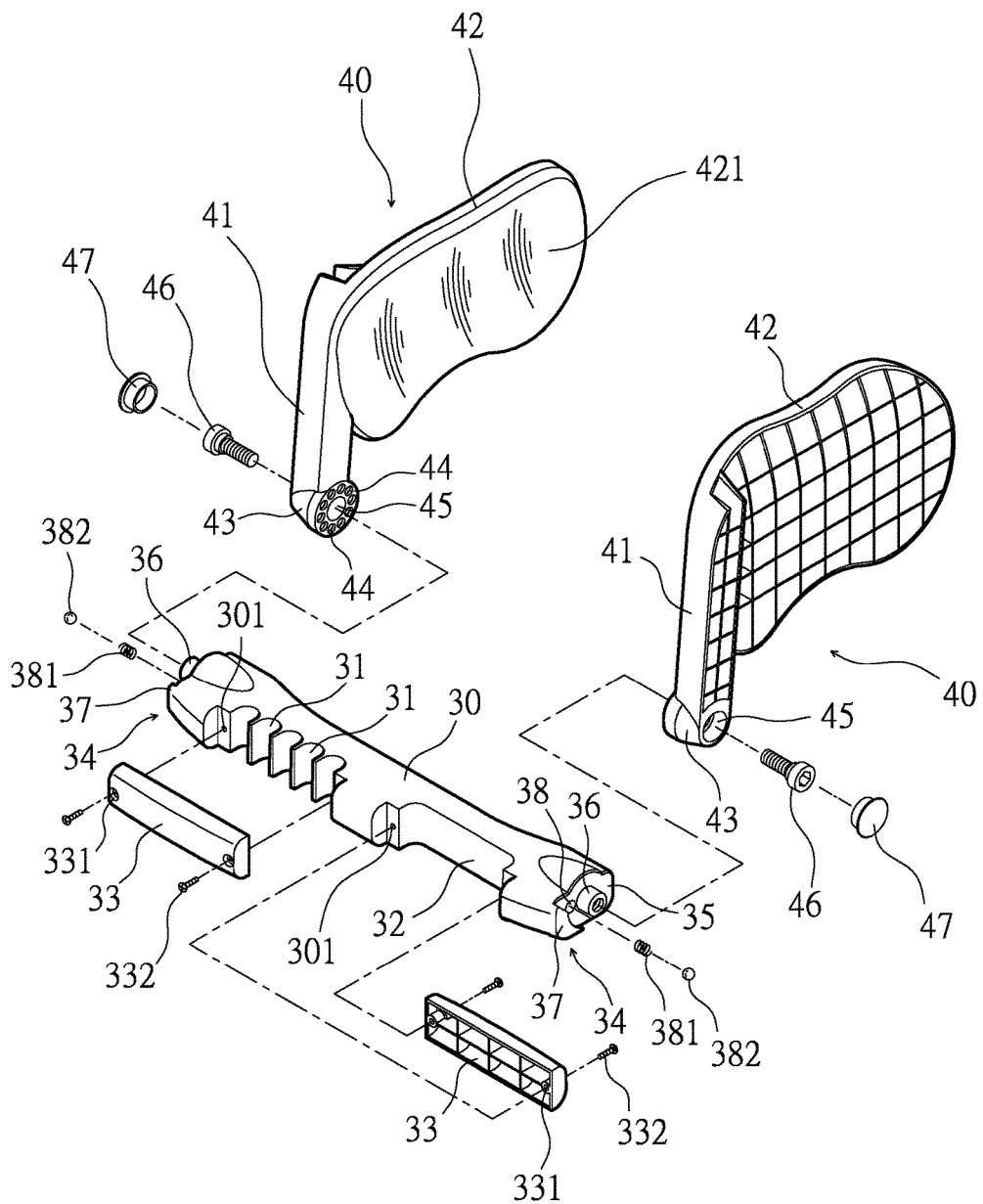
FIG. 7 is an exploded view of the present invention.
Figure 8:
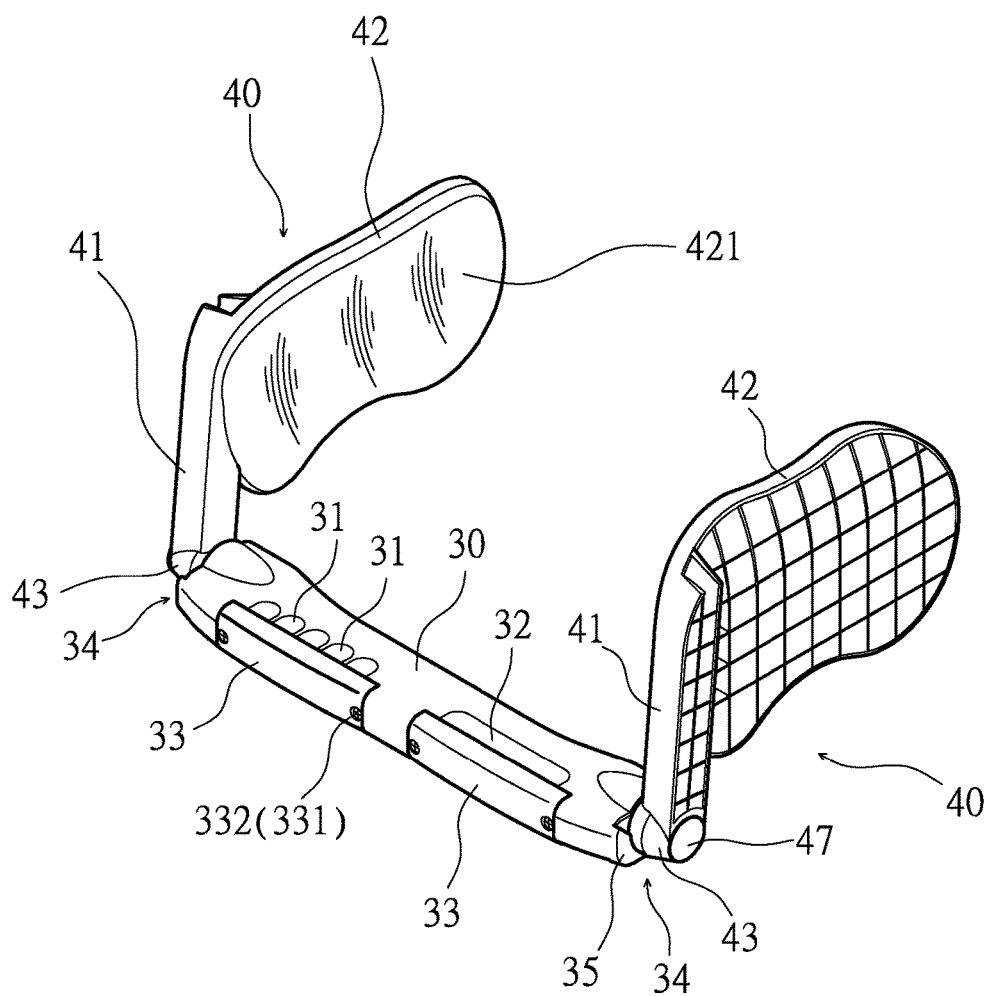
FIG. 8 is a perspective view of the present invention.

Embodiments of the present invention will now be described, by way of example only, with reference to the accompanying drawings.

As shown in FIG. 7 to FIG. 11, the present invention discloses a vehicle headrest structure. The vehicle headrest structure comprises a fixing seat 30, two cover plates 33, two axle portions 34, two headrest bodies 40, two screws 46, and two plugs 47. The fixing seat 30 has a plurality of buckle grooves 31 and a buckle slot 32 at a side thereof. The two cover plates 33 are detachably connected to the side of the fixing seat 30 for covering the buckle grooves 31 and the buckle slot 32 at the side of the fixing seat 30. The two axle portions 34 are disposed at outer end portions of the fixing seat 30, respectively. Opposite outer sides of the two axle portions 34 each have a vertical connecting surface 35. The connecting surface 35 is provided with a protruding axle 36 and a limit block 37. The limit block 37 is located at the same side as the buckle grooves 31 and the buckle slot 32. The connecting surface 35 has at least one accommodation recess 38 formed in the vicinity of the protruding axle 36. A spring 381 and a steel ball 382 are provided in the accommodation recess 38. The steel ball 382 is confined in the accommodation recess 38 and elastically extends out of the connecting surface 35. The two headrest bodies 40 are located at the outer sides of the two axle portions 34. Each headrest body 40 includes a turning arm 41, a headrest portion 42 at one end of the turning arm 41, and a pivot portion 43 at another end of the turning arm 41. An inner side of the headrest portion 42 is provided with a curved surface 421. An inner side of the pivot portion 43 is provided with a plurality of positioning recesses 44 arranged in a circle. An outer side of the pivot portion 43 is provided with a stepped perforation 45 penetrating through the pivot portions 43. The screw 46 is inserted in the stepped perforation 45, and is screwed to the protruding axle 36 of the axle portion 34. The accommodation recess 38 corresponds in position to one of the positioning recesses 44, so that the steel ball 382 is elastically engaged in one of the positioning recesses 44. The plug 47 is disposed on the stepped perforation 45. Through the above-described structure, the fixing seat 30 may be mounted to headrest support rods 1 of different models without adjusting the length. The vehicle headrest structure of the present invention can be assembled conveniently and used with ease, and has a low manufacturing cost, and is more durable. The curved surface 421 of the headrest portion 42 is more in line with the user's face contour to provide a more comfortable effect.

Figure 9:
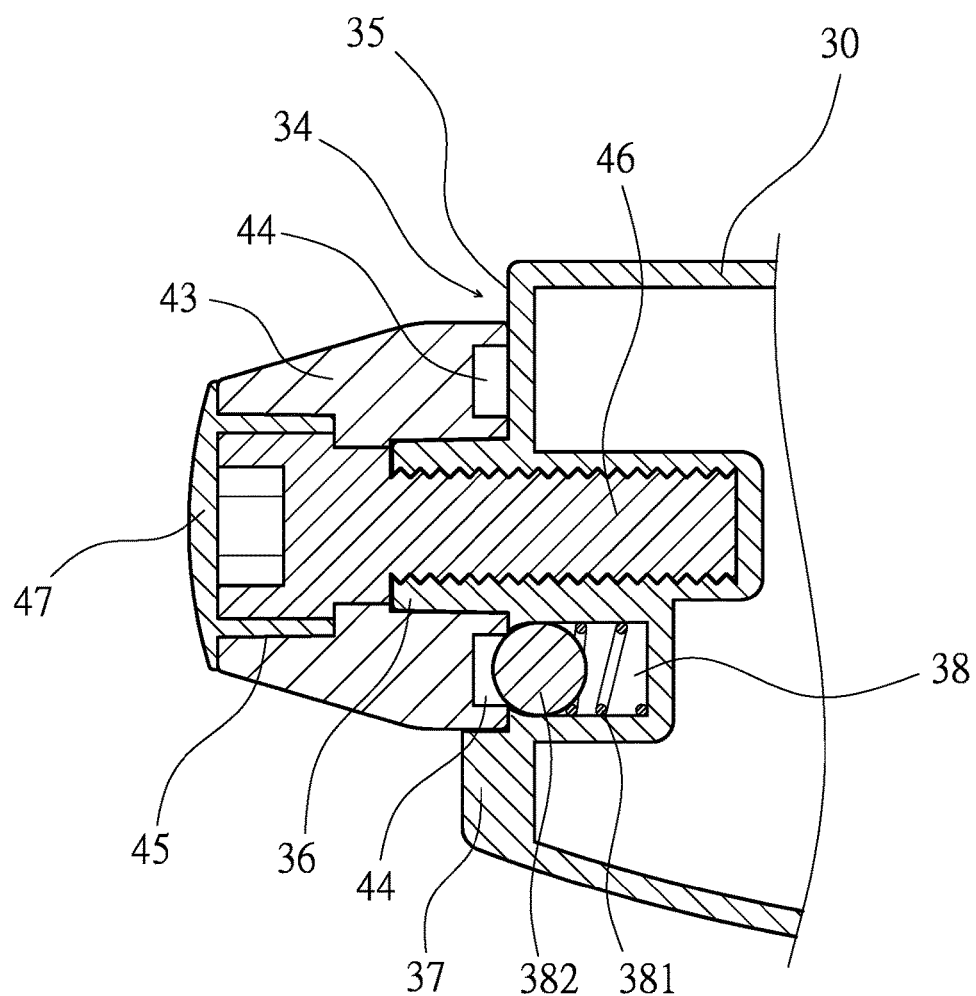
FIG. 9 is a partial sectional view of the axle portion and the pivot portion of the present invention.

The assembly, function and details of the above-described embodiment are described below. Referring to FIG. 7 to FIG. 12, when the present invention is assembled, the pivot portion 43 of the headrest body 40 is pivotally connected to the protruding axle 36 (as shown in FIG. 9). The connecting surface 35 is attached to the inner side of the pivot portion 43. The steel ball 382 is confined in the accommodation recess 38, and a portion of the steel ball 382 extends out of the connecting surface 35 to be engaged in one of the positioning recesses 44. When the headrest body 40 is pulled to turn the pivot portion 43, the steel ball 382 is elastically compressed by the edge of the corresponding positioning recess 44 to be retracted into the accommodation recess 38, and then the steel ball 382 can be biased outward again to engage with another positioning recess 44 for changing a different position. The spring 381 uses a plurality of coils to supply a resistance force against an external force, so the applied force is uniform. The spring 381 is more durable for use. Furthermore, the side of the fixing seat 30 is provided with a plurality of screw holes 301. Two sides of each cover plate 33 are provided with through holes 331. The cover plates 33 are screwedly connected to the screw holes 301 of the fixing seat 30 by screws 332. The cover plates 33 are configured to cover the buckle grooves 31 and the buckle slot 32 at the side of the fixing seat 30. The two plugs 47 are plugged onto the stepped holes 45 of the two pivot portions 43 to cover the stepped holes 45. Thus, the assembly of the vehicle headrest of the present invention is completed.

Figure 10:
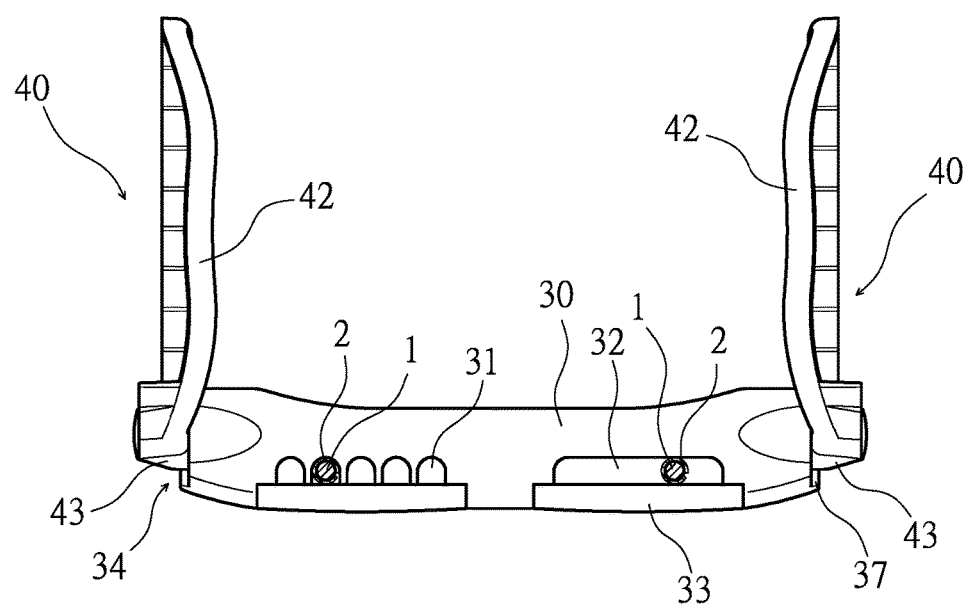
FIG. 10 is a schematic view of the present invention mounted to a pair of support rods having a larger interval therebetween.
Figure 11:
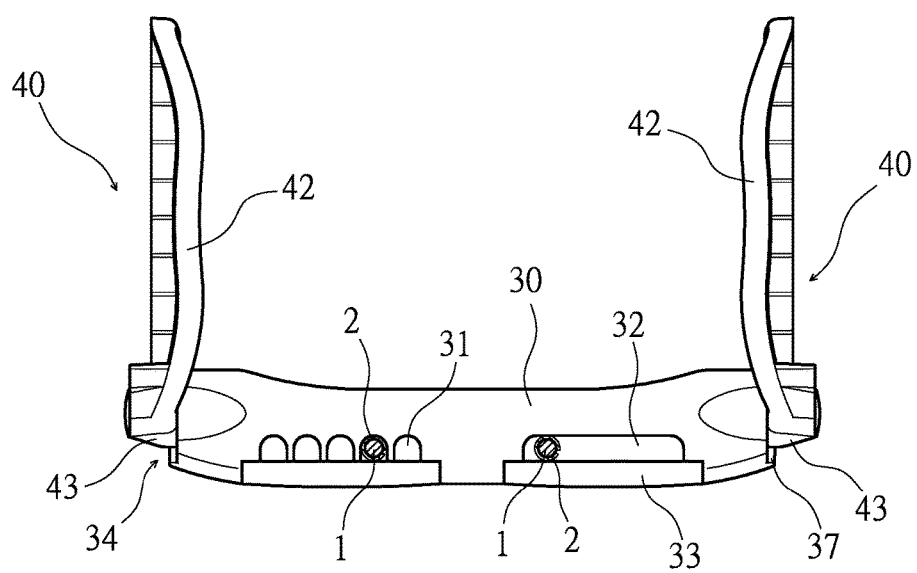
FIG. 11 is a schematic view of the present invention mounted to a pair of support rods having a smaller interval therebetween.
Figure 12:
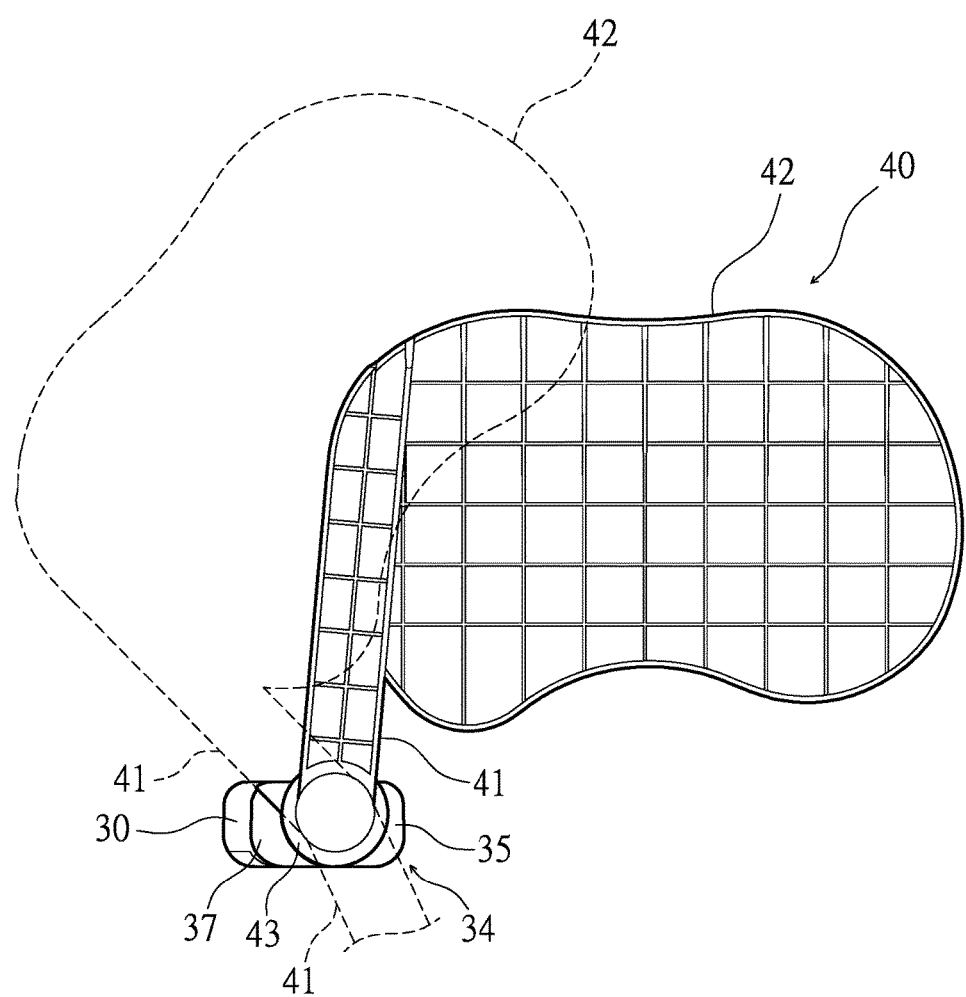
FIG. 12 is a schematic view showing the turning of the headrest body of the present invention.

Referring again to FIG. 7 to FIG. 12, when in use, the present invention is mounted to the two support rods 1 of a vehicle seat headrest. First, the cover plates 33 are removed from the fixing seat 30, so that the buckle grooves 31 and the buckle slot 32 of the fixing seat 30 are not obstructed for the fixing seat 30 to lean against the two support rods 1 of the seat headrest. A corresponding one of the buckle grooves 31 is first engaged with the first support rod 1, and then the buckle slot 32 is engaged with the second support rod 2. Finally, the two cover plates 33 are connected to the fixing seat 30 by the screws 33, as shown in FIG. 10 and FIG. 11, to cover the buckle grooves 31 and the buckle slot 32 of the fixing seat 30. The space of each buckle groove 31 only allows insertion of one support rod 1, so the fixing seat 30 is restricted by the support rods 1 and will not displaced left and right. The buckle slot 32 has an elongate space for receiving the second support rod 1 having a different interval, that is, the interval between the two support rods of different brands and cars is not the same, and the buckle slot 32 is able to accommodate the support rods 1 having a different interval and may be adapted for different types of vehicles. In this way, the fixing seat 30 is secured between the vehicle seat and the headrest. The diameter of the support rod 1 of a different headrest is slightly different. In case the diameter of the support rod 1 is small, the support rods 1 are not stably positioned in the buckle groove 31 and the buckle slot 32 when the fixing seat 30 is coupled to the support rods 1, which may lead to a shake. Therefore, the buckle groove 31 and the buckle slot 32 may be provided with sleeves 1 corresponding in diameter to the support rods 1 for filling up the spaces of the buckle groove 31 and the buckle slot 32, such that the support rods 1 are stably held and positioned, without shaking. When in use, the two headrest bodies 40 turned forward toward the user's head and pivoted about the two protruding axles 36. The steel ball 382 biased by the spring 381 in the accommodation recess 38 is elastically pressed against one of the positioning recesses 44, so that the headrest body 40 can be held and positioned at a desired angle to facilitate the use of different conditions. When not in use, the two headrest bodies 40 are turned upward or downward to a position that does not obstruct the user's sight. The limit block 37 is configured to limit the rotational angle of the turning arm 41, not to be turned rearward, so that the headrest body 42 will not be turned over. It is worth mentioning that the curved surface 421 of the headrest portion 42 allows the user's head to fully rest thereon so that the head gets the most comfortable support to facilitate sleep in the shortest time for the user to have a rest.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A vehicle headrest structure, comprising:

A fixing seat, having a plurality of buckle grooves and a buckle slot at a side thereof, wherein the buckle slot has an elongate space for accommodating a support rod of a headrest in different positions of the elongate space;

two cover plates, detachably connected to the side of the fixing seat for covering the buckle grooves and the buckle slot at the side of the fixing seat;

two axle portions, disposed at outer end portions of the fixing seat respectively, opposite outer sides of the two axle portions each having a connecting surface, the connecting surface being provided with a protruding axle and at least one accommodation recess, a spring and a steel ball being provided in the accommodation recess, a spring and a steel ball being provided in the accommodation recess, a portion of the steel ball elastically extending out of the connecting surface;

two headrest bodies, each including a turning arm, a headrest portion at one end of the turning arm, and a pivot portion at another end of the turning arm, an inner side of the pivot portion being provided with a plurality of positioning recesses arranged in a circle, an outer side of the pivot portion being provided with a stepped perforation, the pivot portions of the two headrest bodies being pivotally connected to the protruding axles of the two axle portions respectively, the steel ball in the accommodation recess being engaged in one of the positioning recesses; and a screw, inserted in the stepped perforation and screwed to the protruding axle of each of the axle portions.

2. The vehicle headrest structure as claimed in claim 1, wherein an inner side of the headrest portion is provided with a curved surface.

* * * * *